US008781612B2

(12) United States Patent
Huijnen

(10) Patent No.: US 8,781,612 B2
(45) Date of Patent: Jul. 15, 2014

(54) METHOD AND DEVICE FOR DIGITALLY PROCESSING AN AUDIO SIGNAL AND COMPUTER PROGRAM PRODUCT

(75) Inventor: Anton Leonard Huijnen, Wijchen (NL)

(73) Assignee: NXP, B.V., Eindhoven (NL)

( * ) Notice: Subject to any disclaimer, the term of this patent is extended or adjusted under 35 U.S.C. 154(b) by 653 days.

(21) Appl. No.: 13/002,683

(22) PCT Filed: May 28, 2009

(86) PCT No.: PCT/IB2009/052252

§ 371 (c)(1),
(2), (4) Date: Jan. 18, 2011

(87) PCT Pub. No.: WO2010/004450

PCT Pub. Date: Jan. 14, 2010

(65) Prior Publication Data

US 2011/0112674 A1 May 12, 2011

(30) Foreign Application Priority Data

Jul. 9, 2008 (EP) .................................... 08104679

(51) Int. Cl.
*H04R 25/00* (2006.01)
*G06F 17/00* (2006.01)

(52) U.S. Cl.
USPC ............................................ 700/94; 381/182

(58) Field of Classification Search
CPC .................................................. G10L 21/0205
USPC .......................... 381/56–59, 97–103; 700/94
See application file for complete search history.

(56) References Cited

U.S. PATENT DOCUMENTS

| | | | | |
|---|---|---|---|---|
| 6,470,376 | B1 | 10/2002 | Tanaka et al. | |
| 6,850,884 | B2 * | 2/2005 | Gao et al. | 704/224 |
| 7,272,556 | B1 * | 9/2007 | Aguilar et al. | 704/230 |
| 8,620,644 | B2 * | 12/2013 | Ryu et al. | 704/201 |

(Continued)

FOREIGN PATENT DOCUMENTS

| | | | |
|---|---|---|---|
| EP | 0 817 045 | A2 | 1/1998 |
| JP | 2002/091782 | A | 3/2002 |

OTHER PUBLICATIONS

Linton, K., et al. "On the Re-Allocation of Processing Resources for Digital Audio Signal Processing," IEE Colloquium on Digital Audio Signal Process, 4 pgs. (Aug. 2002).

(Continued)

*Primary Examiner* — Fan Tsang
*Assistant Examiner* — Eugene Zhao

(57) ABSTRACT

A method of digitally processing an audio signal by sequentially performing a plurality of operations on an input audio signal by a plurality of algorithms to provide an output audio signal is provided. The method comprises automatically performing the following steps: sequentially performing the plurality of operations (a, b, c, . . . ) on an input audio signal (20) in a first sequence of operations and independently in at least one different sequence of operations; evaluating the quality of respective output audio signals (output . . . 1, output . . . 2 . . . , output . . . n!) achieved with the first sequence and the at least one different sequence; and selecting the sequence of operations providing the highest quality output audio signal for further processing of input audio signals.

17 Claims, 2 Drawing Sheets

(56) References Cited

U.S. PATENT DOCUMENTS

| | | | | |
|---|---|---|---|---|
| 2002/0023120 | A1 | 2/2002 | Gentric | |
| 2002/0069075 | A1 | 6/2002 | Miet | |
| 2006/0133358 | A1 * | 6/2006 | Li et al. | 370/352 |
| 2009/0074112 | A1 * | 3/2009 | Coersmeier et al. | 375/340 |
| 2009/0238370 | A1 * | 9/2009 | Rumsey et al. | 381/58 |
| 2009/0238371 | A1 * | 9/2009 | Rumsey et al. | 381/58 |

OTHER PUBLICATIONS

Taniguchi, T., et al, "Combined Source and Channel Coding Based on Multimode Coding," 1990 Int'l. Conf. on Acoustics, Speech, and Signal Processing, pp. 477-480 (Apr. 1990).

International Search Report and Written Opinion for Int'l. Patent Appln. No. PCT/IB2009/052252 (Sep. 16, 2009).

* cited by examiner

METHOD AND DEVICE FOR DIGITALLY PROCESSING AN AUDIO SIGNAL AND COMPUTER PROGRAM PRODUCT

FIELD OF THE INVENTION

The invention relates to a method, a device and a computer program product for digitally processing an audio signal.

BACKGROUND OF THE INVENTION

Due to the high sensitivity of the human auditory perception system, audio quality is an important marketing parameter for equipment producing audio. In modern systems, a lot of audio post-processing is done to alter an actual signal which is sent to the speakers. Because of the need for high audio quality, a lot of tuning is needed inside these systems to integrate all features, while preserving a high quality of the output signal. This tuning is usually done after all features have been integrated in the system. Mostly, this tuning is based on avoidance of any overflow in the signal. To achieve this, usually the signal is scaled down at an input of the system to create so-called headroom for further features to be realized. This headroom is then filled by some or all of the features implemented in the device. However, because of the scaling, signal precision is lost, leading to increased quantification noise in the output signal of digital audio processing systems. Furthermore, in the known devices, the required tuning task has to be performed manually and requires a high level of audio expertise. As a result, the required tuning is rather expensive and time-consuming.

For example, US 2002/0023120 A1 relates to a method for digitally processing multimedia data including an audio signal.

In devices digitally post-processing audio data before the audio data is output to a speaker, a plurality of features for altering the sound is typically provided. These features may include volume control, tone control, equalization, compression/expansion, voice filtering, limiter processing, etc. realized by amplification, attenuation, low-pass filtering, high-pass filtering, band pass filtering, band-stop filtering, etc. and forming a large number of processing tasks which have to be realized by algorithms in a digital signal processing unit. The respective algorithms are performed on the input audio signal one after the other in a sequence.

To keep costs, required memory and/or area needed for digital audio signal processing low, in many cases, instead of floating point processing providing higher accuracy, processing is done by fixed point processing. However, such fixed point processing leads to a limited signal to noise ratio and requires considerable headroom.

It has been found that the achieved result for the quality of the output audio signal (after the processing tasks have been applied to the input signal) strongly depends on the sequence in which the different tasks are performed. In many cases, the sequence (order of processing tasks) with which the best quality of the output audio signal is achieved differs from the expected one. Thus, the results for an optimum sequence of processing tasks are often counter-intuitive and may even change if an additional processing task is introduced or the signal characteristics of the input audio signal change.

Since usually a large number n of possible processing tasks is implemented, the best sequence of processing tasks for achieving the highest possible output audio signal quality cannot easily be found by manually trying different sequences of the processing tasks. In this context it should be noted that the number of possible sequences (=number of possible permutations in the order of the desired processing tasks) is n!.

OBJECT AND SUMMARY OF THE INVENTION

It is an object of the present invention to provide a method of digitally processing an audio signal, a device for digitally processing an audio signal and a computer program product which allow achieving high quality of output audio signals and at the same time keep costs, required memory acid/or area needed for digital audio signal processing low.

This object is solved by a method of digitally processing an audio signal according to claim 1. A method of digitally processing an audio signal by sequentially performing a plurality of operations on an input audio signal by a plurality of algorithms to provide an output audio signal is provided. The method comprises automatically performing the following steps: sequentially performing the plurality of operations on an input audio signal in a first sequence of operations and independently in at least one different sequence of operations; evaluating the quality of respective output audio signals achieved with the first sequence and the at least one different sequence; and selecting the sequence of operations providing the highest quality output audio signal for further processing of input audio signals. Thus, an input audio signal is digitally processed with a plurality of operations performed in a first order and with the plurality of operations performed in a different order (in a different sequence of processing steps); i.e. the order in which the tasks work on the signal is changed. The respective resulting output audio signals (corresponding to the different sequences of operations) are evaluated and their quality is assessed. The sequence of audio operations providing the higher quality output audio signal is selected for further processing of input audio signals. According to the method, all these steps are automatically performed. As a consequence, the sequence of processing operations providing the highest quality of the output signal can be determined and selected for processing of further input audio signals without requiring human intervention. Even in cases in which a large number of different processing operations is performed on the input audio signal, a high quality output audio signal can be achieved at low costs, without requiring large memory space, and, if desired, this can be implemented in an embedded technique as special purpose hardware in a small area.

Depending on different possibilities for evaluating the quality of the resulting: output audio signals (e.g. using a reference audio signal, using a number of specific test signals, or using a part of an input audio signal which is to be processed), the method is suited for both optimization of the sequence of processing operations at the design time (e.g. one-time setting) and for run-time optimization processes. The processing operations to be performed on the input audio signal for generating the output audio signal may include different kinds of typical audio signal altering processes such as volume control, tone control, equalization, compression/expansion, voice filtering, limiter processing, etc.

Preferably, the plurality of operations is sequentially performed on the input audio signal in a plurality of different sequences corresponding to permutations of the first sequence. In this case, the plurality of operations to be performed can conveniently be provided as a list. The permutation of the operations contained in the list can be realized in a resource-saving manner without requiring sophisticated algorithms.

According to one aspect, the plurality of operations is sequentially performed on the input audio signal for all possible permutations of the first sequence and the sequence providing the highest output audio signal quality is selected for further processing. This case is particularly suited for one-time optimization of the task order at the time of design, since all possible orders of tasks are evaluated and the sequence of operations achieving the best results can be determined in an automated way. Preferably, the optimization can be performed applying a plurality of different test signals as the input audio signal. Suitable test signals may include white and/or pink noise, frequency sweeps, combinations of tones and noise, etc. Further real world signals such as music, speech, combinations of music and speech, etc. can be used.

According to another aspect, the quality of the respective output audio signal achieved with a specific sequence is compared to the quality of the output audio signal achieved with a sequence which has up to that point in time provided the best quality of the output audio signal. In this case, only the best result for the sequence of operations, which has been evaluated up to a certain point in time, has to be kept in memory and further permutations of the sequence of operations can be compared to this best result. Thus, the method can be implemented in a particularly resource-saving manner. As an alternative, a small number of most preferred results can be compared to the results acquired for a new sequence. In this case, results can be compared more detailed (e.g. with respect to quality achieved in different frequency bands or for different volumes of the audio signal etc.). Preferably, the quality of the respective output audio signals is evaluated by comparison to a reference signal. In case of using the method at the time of design of a device for digitally processing an audio signal, several different reference signals are possible as has been mentioned above. Reference signals which are particularly suited for the expected audio signals in an intended use of the device can be selected. In case of run-time optimization of the sequence of audio operations, for example a small part of the input audio signal can be processed in a more sophisticated way which requires more resources (e.g. double precision floating point processing) and taken as a reference signal. The entire input signal can be processed by resource-saving processing (e.g. fixed point processing) using the results achieved with the small part reference signal. In this way, an overall resource-saving implementation is achieved. The limited part of the input audio signal used for generating the reference signal could e.g. be only a small time-period of the signal, only a limited amount of channels (e.g. the front channels only for a multi-channel signal), a sub-sampled part of the input audio signal (i.e. taken only every n-th sample), or any combinations of these. According to another aspect, the quality of the respective output audio signals is evaluated by comparison to a theoretical model. In this case, a theoretical model using transfer functions can be used for example. Further, a theoretical model describing simple signal characteristics such as mean, maximum, and minimum values can be used to realize the method in a resource-saving manner.

Preferably, the plurality of operations includes operations for altering the sound of the input audio signal. Such audio post-processing operations may typically include volume control, tone control, equalization, compression/expansion, voice filtering, limiter processing etc.

The object is further solved by a device for digitally processing an audio signal according to claim 8. The device comprises a digital signal processing unit sequentially performing a plurality of operations on an input audio signal by a plurality of algorithms to provide an output audio signal. The digital signal processing unit is adapted such that: the plurality of operations is sequentially performed on an input audio signal in a first sequence of operations and independently in at least one further sequence of operations; the quality of the respective output audio signals is evaluated; and the sequence of operations providing highest quality of the output audio signal is selected for further processing of input audio signals. The device achieves the advantages which have been described above with respect to the method.

According to an aspect, the device is an embedded system. In this case, the described features are particularly suited for design-time optimization of the order of processing tasks. However, run-time optimization is also possible, e.g. by using a reduced signal part as a reference signal for optimization.

According to another aspect, the device is formed by a personal computer provided with an appropriate program. In this case, a device for digitally processing an audio signal providing high audio quality can be realized in a very resource-saving manner. Thus, the resources are available for other tasks.

The object is further solved by a computer program product according to claim 11. The computer program product comprises program code for executing the method according to any one of claims 1 to 8 when the program is executed in a computer. In this case, the method as defined above can be easily realized on existing computers. The advantages as described above with respect to the method can be realized. The program code can be provided on a data carrier or to be downloadable e.g. from the internet or an internet and the like. Preferably, the computer program product is stored on a machine-readable carrier which can e.g. be formed by a CD-ROM, USB stick, etc.

BRIEF DESCRIPTION OF THE DRAWINGS

The invention will be described in greater detail hereinafter, by way of non-limiting examples, with reference to the embodiments shown in the drawings.

DESCRIPTION OF EMBODIMENTS

An embodiment will be described with respect to FIGS. 1 and 2. The method according to the embodiment which will first be described is particularly suited for optimization of the quality of an output audio signal of a device for digitally processing an audio signal at the time of design, i.e. before the device is delivered to customers.

In the method for digitally processing an input audio signal 20, a plurality of different audio processing operations a, b, c, . . . has to be performed on the input audio signal 20. The different audio processing operations a, b, c, . . . (audio processing tasks) are to be performed on the input audio signal 20 one after the other in a signal processing chain. In other words, the different processing tasks are serially applied to the input audio signal 20 one after another. The audio processing operations may e.g. include volume control, tone control, equalization, compression, expansion, voice filtering, limiter processing, etc., i.e. operations for altering the sound of the input audio signal. The audio processing operations a, b, c, . . . which have to be performed on the input audio signal are provided as a list in which the distinct audio processing operations are listed.

According to the embodiment, the input audio signal 20 is processed by sequentially applying the plurality of audio processing operations a, b, c, . . . in a first sequence. This results in a (processed) output audio signal output_1 corresponding to this first sequence. Further, the order of the audio processing operations a, b, c, . . . contained in the list is changed to provide a second sequence which is different from the first sequence. For example, this can be conveniently achieved by permutating the order of the audio processing operations a, b, c, . . . . In the following, a non-limiting example will be described in which the total number of audio processing operations to be performed on the input audio signal 20 is three. However, it should be noted that the number of audio processing operations is not limited to three but can be any integer n.

Figure 1:
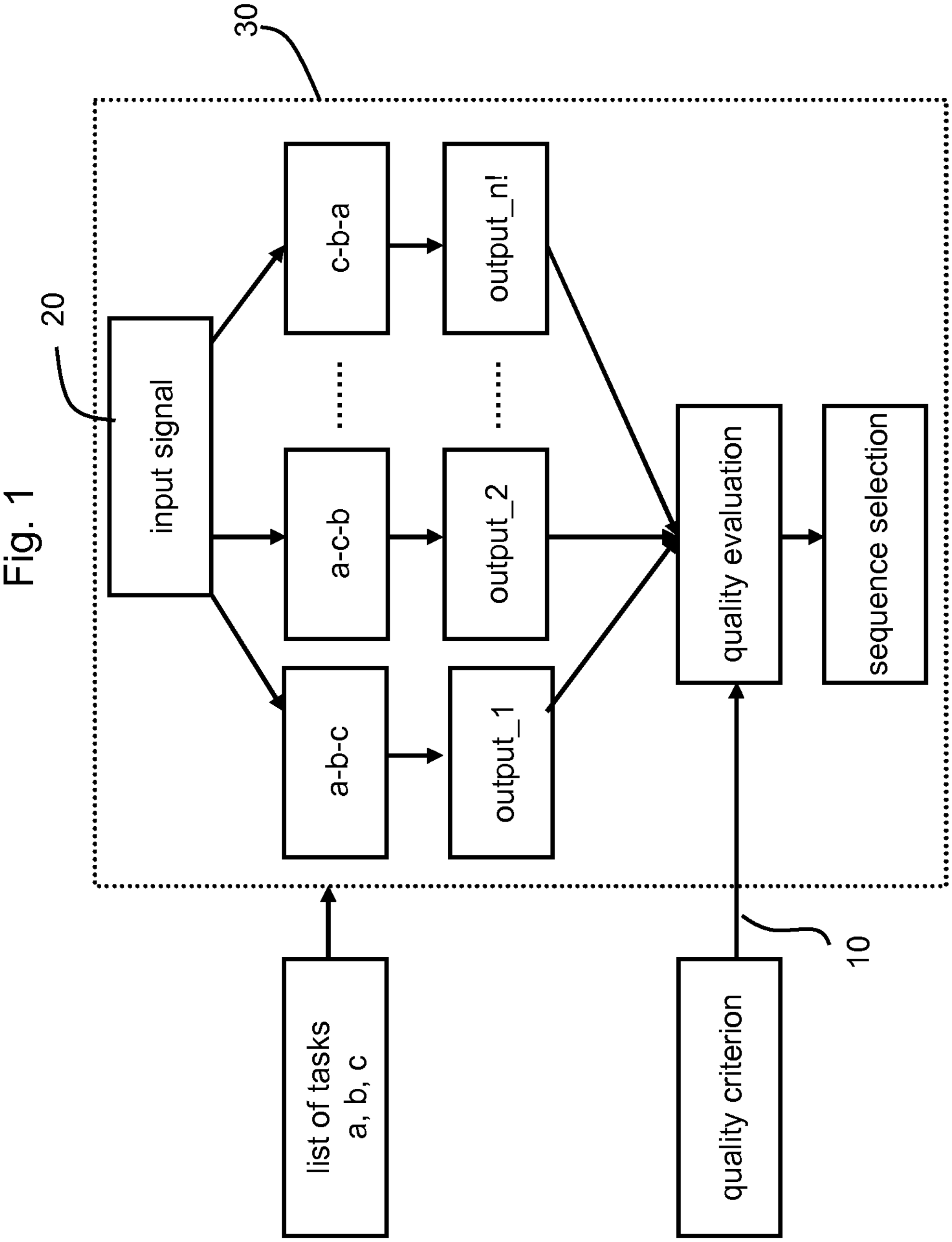
FIG. 1 schematically shows the steps of a method according to one example.

In the case of n=3 (tasks a, b, c) shown in FIG. 1, for example the first sequence applies the tasks a-b-c to the input audio signal 20 in this order, i.e. first task a is applied, then task b, and then task c. After permutation of the task order, in the second sequence the tasks are applied to the input audio signal in the order a-c-b. According to the example, all possible permutations of the task order (order of audio processing operations) are applied to the input audio signal; i.e. with respect to n=3, six different sequences of audio processing operations a, b, c are applied to the input audio signal (namely the sequences a-b-c; a-c-b; b-a-c; b-c-a; c-a-b; c-b-a). Please note that, for a number n of audio processing operations, the number of permutations is n!. Each of the permutations provides a corresponding output audio signal output_1, output_2, . . . , output_n!.

In a further step, the signal quality of the respective output audio signals output_1, output_2, . . . , output_n! is evaluated. Evaluation of the quality of the output audio signals is achieved by applying a quality criterion to the respective output audio signals. The quality criterion can e.g. be realized by comparison of the respective output audio signals to a reference signal 10. If the method is applied at the design time of a device for digitally processing an audio signal as described in this first example, the reference signal 10 can be a high quality reference signal which is generated by more sophisticated devices for processing audio signals (which can be analog, digital, or a combination of both). By comparison of the respective output audio signals output_1, output_2, . . . , output_n! to the reference signal 10, the sequence of audio processing operations providing the highest quality of the output audio signal can be determined. This can e.g. be achieved by comparison over a complete frequency spectrum, comparison in specific frequency ranges, etc. and e.g. realized by known algorithms in a digital signal processing unit 30 such as comparison of RMS values (root means square).

Based on the results of the quality evaluation, the sequence providing the highest quality is selected for further processing of input audio signals. In the described example of design-time optimization, the sequence providing the highest quality can e.g. be fixedly pre-determined for further processing of input audio signals after delivering of the device for digitally processing audio signals to customers.

It should be noted that the invention is not limited to the example described above. For example, it has been described that the respective output audio signals output_1, output_2, . . . , output_n! are generated for different sequences and their quality is evaluated thereafter. However, it is also possible to generate the output audio signal corresponding to a specific sequence and first evaluate the quality and store the result. Thereafter, the same procedure is done for other sequences. This alternative is particularly suited for modifications which do not exploit all possible permutations of the order of tasks as will be described below.

Instead of exploiting all possible permutations, for example random task ordering can be exploited in which a further sequence of tasks is generated by randomly re-ordering the tasks. Alternatively, e.g. evolutionary task ordering can be applied in which the next sequence of tasks is determined from a collection of already evaluated task orders which have provided the best output signal quality up to this point. For these alternatives which do not take all permutations into account, preferably a set of x (x being an integer) quality results is maintained in memory and the set is updated after evaluation of each further sequence by keeping the results for those sequences which have provided the best result up to that point in time. It should be noted that different alternatives of changing the order in which the tasks (audio processing operations) work on the input audio signal are possible.

Although it has been described that evaluation of the quality of the respective output audio signals output_1, etc. is done by comparison to a reference signal, other alternatives for quality evaluation exist. For example, the respective output audio signals can be analyzed with respect to a theoretical model. Theoretical models employing transfer functions can be used or more simple theoretical models describing signal characteristics such as maximum, mean, minimum, etc.

Other alternatives for determining the quality of the output audio signals after all tasks (audio processing operations) have performed their processing on the input audio signal are possible.

In the method of digitally processing an audio signal, for the optimization of the order of tasks, different signals can be used as input audio signals. For example, for finding the best suited sequence, test signals can be applied as input audio signals. Such test signals may include white or pink noise, frequency sweeps, combinations of tones and noise, etc. Further, real world signals can be used as input audio signal such as e.g. music, speech, combinations of music and speech etc.

Although design-time optimization of the sequence of audio processing operations has been described, the invention is not restricted to this. Run-time optimization is also possible, as will be described in the following. For run-time optimization, in principle also comparison to a reference signal is possible. However, in many cases no specific test signals will be available (in particular in realization in embedded systems). Further, if the complete input audio signal which is to be processed by the plurality of audio processing tasks was processed in a sophisticated high-quality manner in order to provide a reference signal, no resource-saving effects would be achieved and such a reference signal could be used as the output audio signal rendering the method according to the invention useless (e.g. in an application in a personal computer, no resources would be saved, and in an application in an embedded system, the system would have to be provided with the capabilities to process the input audio signal in a high quality manner (e.g. requiring floating-point processing)). However, a reference signal can be provided and, at the same time, a resource-saving implementation is possible according to the method described in the following.

For example, in an implementation in a device provided with resources allowing high-quality processing such as a personal computer, a small part of the input audio signal can be processed in a sophisticated manner (e.g. by double precision floating-point processing) to provide a high-quality reference signal, and the complete input audio signal can be processed in a less-sophisticated resource-saving manner (e.g. by fixed-point processing). Thus, the best sequence of the tasks for resource-saving processing can be determined by exploiting the reference signal. Since only a small part (fraction) of the input audio signal is processed in the sophisticated manner, an overall resource-saving implementation is achieved.

With respect to applications in embedded systems, special care has to be taken, since the reference signal is not fully available. This is due to the fact that generation of a (full) reference signal requires high use of system resources such as processing power and memory. However, a small part (fraction) of the reference signal may suffice in order to realize the advantages, in particular to determine the optimum sequence of the audio processing operations. Thus, e.g. fixed-point processing of the complete input audio signal can be realized in an embedded system in a resource-saving, cost-efficient way and only limited resources for generating the reference signal are required.

Suitable fractions of an input audio signal for generating the reference signal are: a small time-period fraction of the input audio signal, a limited amount of channels in a multi-channel signal (e.g. only the front channels), a sub-sampled part of the signal (e.g. only every n-th sample taken), or any combinations of these. For example, as a small time-period fraction only the loudest part of the input audio signals could be used.

In cases of run-time optimization, the order of the audio processing operations does not have to stay fixed but an adaptation to the actual processed signal content of the input audio signal is possible.

Further, different ways of stopping the optimization process can be realized. In the case of exploiting all possible permutations, the optimization process is stopped after all permutations have been investigated. In case of continuous run-time optimization for the current input audio signal, the optimization process is never stopped and the best sequence for the current input audio signal can be determined. As an alternative, a stop criterion can be defined at which the optimization effort outweighs the improvement in output audio signal quality.

Figure 2:
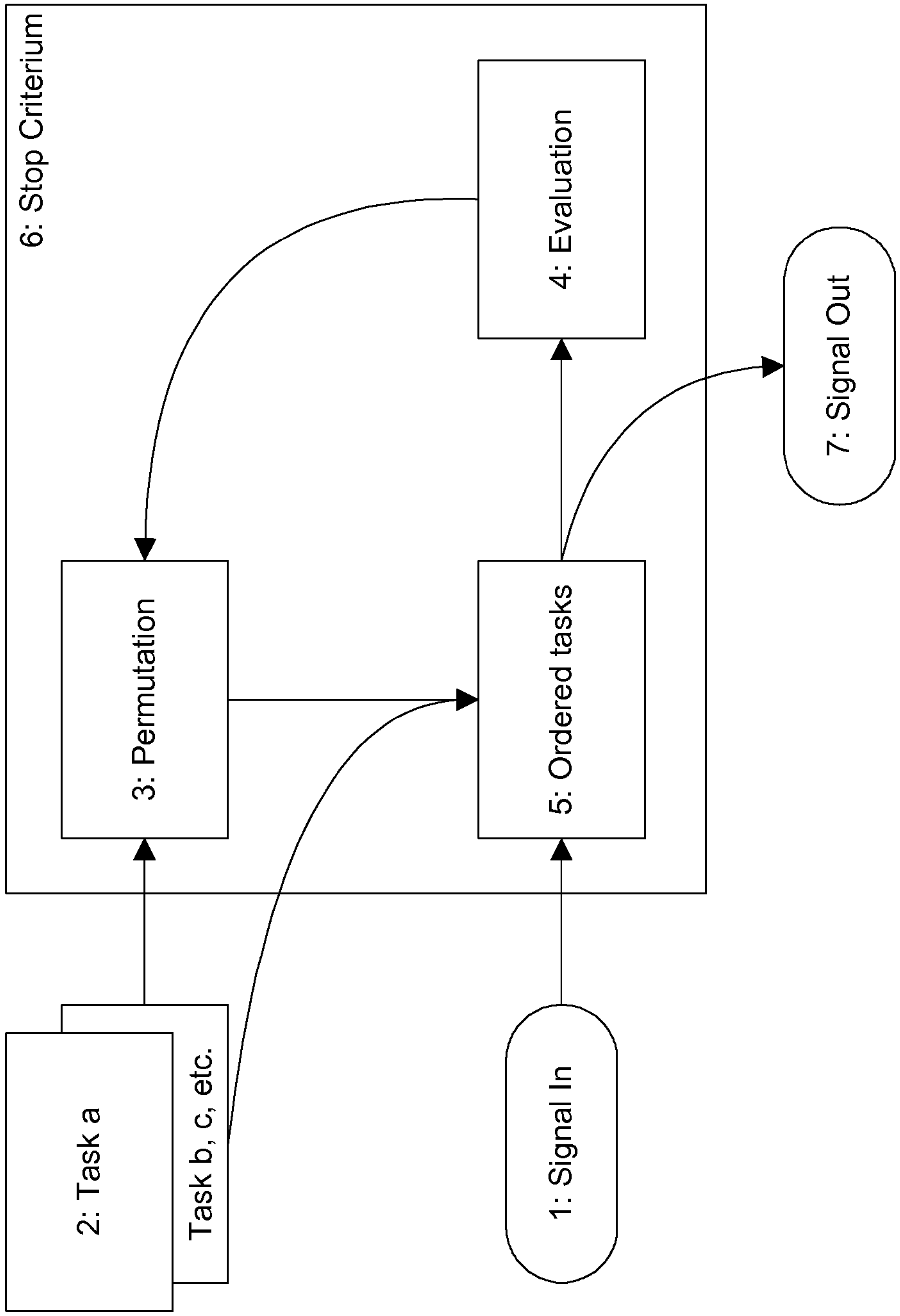
FIG. 2 schematically shows the general steps in an embodiment.

In a summary, as can be seen in FIG. 2, the method according to the example requires: an input audio signal (1.); a number of processing tasks to be performed on the input audio signal (2.); a way of changing the order (sequence) in which the tasks work on the input audio signal (3.); a method to determine the signal quality after all tasks have performed their processing (4.); a method for selecting the task-order for which the quality of the output audio signal is optimum (5.); means for stopping further optimization (6.); and the output audio signal after processing in the optimum task order (7.).

Specific features for an exemplary implementation on a PC in a test environment which has been realized by the inventors will now be described. The implementation can be realized in LabView® or any other suitable programming language.

A: A number of test signals is provided and can be selected. The test-signals include standard test-signals such as tones&noise, triangular, square, sawtooth, increasing and decreasing ramps, pink and white noise, impulse, sweep, sin c, sine, cosine, etc. (all available in LabView® for example).

B: A number of audio processing related tasks is provided such as: amplify, attenuate, low-pass, high-pass, band-pass, band-stop, limiter, etc.

C: A set of 5 random permutations together with the best found permutation until now is created.

D: The RMS (root mean square) difference between a double precision float signal as a reference signal and a fixed point signal using 8 bit for the representation is calculated.

E: The best permutation found until now (i.e. the best RMS value from step D) is used to do the actual processing.

F: The stop criterion (to stop the optimization process) is implemented with a stop button such that the optimization is stopped upon pressing of the button by a user.

G: The output signal is put in a graph showing the processed signal together with the processed reference signal for visual comparison.

The features described above can e.g. be advantageously applied to many types of equipment processing digital audio signals such as e.g. personal entertainment products, mobile or car entertainment products. Particularly advantageous is an application with respect to embedded fixed-point processors.

The invention claimed is:

1. A method of digitally processing an audio signal by sequentially performing a plurality of audio operations on an input audio signal by a plurality of algorithms to provide an output audio signal; the method comprising:

sequentially performing the plurality of audio operations on the input audio signal in a first sequence of audio operations and independently in at least one different sequence of audio operations, wherein the first sequence and the at least one different sequence have different permutations of an identical list of audio operations;

evaluating a quality of respective output audio signals achieved with the first sequence and the at least one different sequence; and selecting a sequence of audio operations providing a highest quality output audio signal for further processing of the input audio signal.

2. The method according to claim 1, wherein the plurality of operations is sequentially performed on the input audio signal in a plurality of different sequences corresponding to permutations of the identical list of audio operations.

3. The method according to claim 2, wherein the plurality of operations is sequentially performed on the input audio signal for all possible permutations of the identical list of audio operations and the sequence providing the highest output audio signal quality is selected for further processing.

4. The method according to claim 1, wherein the quality of the respective output audio signal achieved with a specific sequence is compared to the quality of the output audio signal achieved with a sequence which has up to that point in time provided the best quality of the output audio signal.

5. The method according to claim 1, wherein the quality of the respective output audio signals is evaluated by comparison to a reference signal.

6. The method according to claim 1, wherein the quality of the respective output audio signals is evaluated by comparison to a theoretical model.

7. The method according to claim 1, wherein the plurality of operations includes operations for altering a sound of the input audio signal.

8. A device for digitally processing an audio signal, comprising:

a digital signal processing unit sequentially performing a plurality of audio operations on an input audio signal by a plurality of audio algorithms to provide an output audio signal, wherein the digital signal processing unit is adapted such that the plurality of audio operations is sequentially performed on the input audio signal in a first sequence of audio operations and independently in at least one different sequence of audio operations, wherein the first sequence and the at least one different sequence have different permutations of an identical list of audio operations, a quality of the respective output audio signals is evaluated, and a sequence of audio operations providing highest quality of the output audio signal is selected for further processing of the input audio signal.

9. The device according to claim 8, wherein the device is an embedded system.

10. The device according to claim 8, wherein the device is formed by a personal computer provided with an appropriate program.

11. A non-transitory, tangible computer readable storage medium having computer executable instructions for digitally processing an audio signal by sequentially performing a plurality of audio operations on an input audio signal by a plurality of algorithms to provide an output audio signal, comprising:

instructions for sequentially performing the plurality of audio operations on the input audio signal in a first sequence of audio operations and independently in at least one different sequence of audio operations, wherein the first sequence and the at least one different sequence have different permutations of an identical list of audio operations;

instructions for evaluating a quality of respective output audio signals achieved with the first sequence and the at least one different sequence; and instructions for selecting a sequence of audio operations providing a highest quality output audio signal for further processing of the input audio signal.

12. The device of claim 8, wherein the plurality of audio operations include at least one from a group of volume control, tone control, equalization, compression, expansion, voice filtering, limiter processing, amplify, attenuate, low-pass, high-pass, band-pass, and band-stop.

13. The device according to claim 8, wherein the quality of the respective output audio signals is evaluated by comparison to a reference signal.

14. The device according to claim 8, wherein the quality of the respective output audio signals is evaluated by comparison to a theoretical model.

15. The device according to claim 8, wherein the quality of the respective output audio signals is evaluated by comparison to a test signal.

16. The device of claim 15, wherein the test signal includes one from a group of white noise, pink noise, frequency sweeps, tones, combinations of tones and noise, triangular, square, sawtooth, increasing ramps, decreasing ramps, impulse, sweep, sin c, sine, and cosine.

17. The device according to claim 8, wherein the device is embedded in at least one from a group including a personal entertainment product, mobile product, car entertainment products, and a fixed-point processor.

* * * * *